United States Patent [19]

Greenberg et al.

[11] Patent Number: 5,167,972

[45] Date of Patent: * Dec. 1, 1992

[54] METHOD OF STABILIZING PEPTIDE SWEETENERS IN CINNAMON-FLAVORED CHEWING GUMS AND CONFECTIONS

[75] Inventors: Michael J. Greenberg, Northbrook; Sonya D. Johnson, Brookfield, both of Ill.

[73] Assignee: Wm. Wrigley Jr. Company, Chicago, Ill.

[*] Notice: The portion of the term of this patent subsequent to Aug. 18, 2009 has been disclaimed.

[21] Appl. No.: 577,770

[22] Filed: Sep. 4, 1990

[51] Int. Cl.$^5$ .......................... A23L 2/26; A23G 3/30
[52] U.S. Cl. .......................... 426/3; 426/5; 426/534; 426/536
[58] Field of Search .............. 426/534, 636, 3, 5

[56] References Cited

U.S. PATENT DOCUMENTS

| | | | |
|---|---|---|---|
| 3,818,107 | 6/1974 | Yolles | 426/3 |
| 3,857,964 | 12/1974 | Yolles | 426/3 |
| 3,879,425 | 4/1975 | Hall | 260/340.9 |
| 4,031,140 | 6/1977 | Schreiber | 260/611 |
| 4,036,886 | 7/1977 | Schreiber | 260/599 |
| 4,206,301 | 6/1980 | Yolles | 536/3 |
| 4,806,364 | 2/1989 | Kubota | 426/5 |
| 4,808,418 | 2/1989 | Zamudio-Tena | 426/5 |
| 4,988,518 | 1/1991 | Patel | 426/5 |

*Primary Examiner*—John W. Rollins
*Assistant Examiner*—Ralph Gitomer
*Attorney, Agent, or Firm*—Willian Brinks Olds Hofer Gilson & Lione

[57] ABSTRACT

A chewing gum composition having improved stability of sweetener is disclosed. At least one cinnamic aldehyde acetal is substituted for cinnamic aldehyde in gums containing peptide sweeteners such as aspartame, alitame and combinations thereof. Of the acetals, most preferred is cinnamic aldehyde propylene glycol acetal. This acetal is particularly useful in cinnamon and fruit-flavored gums and especially in sugarless gum. Cinnamic aldehyde acetal is also added to other oral compositions, such as foods, drugs and toothpaste.

9 Claims, No Drawings

METHOD OF STABILIZING PEPTIDE SWEETENERS IN CINNAMON-FLAVORED CHEWING GUMS AND CONFECTIONS

BACKGROUND OF THE INVENTION

The present invention relates to methods for producing chewing gum. More particularly, the invention relates to methods for producing chewing gum containing acetals of cinnamaldehyde and peptide sweeteners with improved shelf-life stability.

In recent years, efforts have been devoted to protecting high-potency sweeteners within the chewing gum formulation from interaction in the presence of aldehyde ingredients, i.e., the protection of the high-potency sweetener against degradation over time. The instability is significant because aldehyde-containing flavor components such as cinnamaldehyde found in cinnamon oil have been known to react with the aspartame and thereby greatly reduce the shelf-stability of aspartame in such a gum.

For example, U.S. Pat. Nos. 4,722,845, issued Feb. 2, 1988, and 4,839,184, issued Jun. 13, 1989, both to Cherukuri et al., teach a process for stabilizing cinnamon-flavored chewing gum in which a dipeptide or amino acid sweetener is encapsulated in a mixture of fat, wax and glyceride. The inventions teach an advantage in using an edible wax with a melting point of 106° C. or greater. First, the fat, wax and glyceride are mixed to form a "hydrophobic matrix." Then, the sweetener is formed into an agglomerate with this hydrophobic matrix. The agglomerates are next screened for appropriate size. Finally, the second or further coating with the hydrophobic matrix is applied using standard fluidized bed granulation techniques. Alternately, the initial coating can be applied by spray congealing techniques. Both of the above Cherukuri et al. patents teach that aspartame is difficult to coat, because of its needle-like shape. To adequately coat aspartame, approximately six times as much coating material as aspartame was used.

U.S. Pat. No. 4,863,745, issued Sep. 5, 1989, to Zibell, teaches a method of encapsulating aspartame or other high-potency sweeteners by applying to already-coated aspartame a second coat consisting predominately of zein, a corn protein. This method results in more gradual release of high-potency sweetness and in protection from degradation by aldehyde constituents.

U.S. Pat. No. 4,931,295, issued Jun. 5, 1990, to Courtright et al., discloses the preparation of a softer zein coating for aspartame which is water soluble and includes water-soluble cellulose. Courtright discloses that encapsulation and protection from degradation occurs when the final product comprises as little as 10% zein.

Examples of aldehyde-containing flavoring agents include, but are not limited to, cinnamon oil, which includes cinnamaldehyde; cherry flavor, which includes benzaldehyde; lemon flavors which contain citral and citronellal; vanilla flavor, which includes vanillin and ethyl vanillin; fruit flavor, which includes acetaldehyde; and orange flavor, which includes undecanal. Other flavors which include aldehyde containing components can be found on pages 325–328 of the book *Flavor Technology: Profiles, Products, Applications*, by Henry B. Heath, M.B.E., B. Pharm., published in 1978 by The AVI Publishing Co., Inc., Westport, Conn. The most popular aldehyde-containing flavor used in chewing gum is a cinnamon flavor. which includes cinnamaldehyde.

Cinnamic aldehyde is the primary ingredient in cinnamon flavoring. Cinnamic aldehyde also is used to enhance fruit and many other flavors. Cinnamic aldehyde has been added to a variety of foods, including gum. In chewing gum, however, the cinnamic aldehyde flavor reacts with peptide sweeteners to form non-sweet products. In addition, the cinnamon flavor dissipates after only a few minutes of chewing. Methods of preventing the dissipation of cinnamaldehyde, including the chemical combination of cinnamic aldehyde with other moieties, have been investigated.

Co-pending, commonly assigned, U.S. patent application Ser. No. 550,676, filed on Jul. 11, 1990, by Sonya Johnson and Michael Greenberg, entitled "Method of Prolonging Flavor in Chewing Gum by the Use of Cinnamic Aldehyde Propylene Glycol Acetal," discloses a novel chemical form of cinnamaldehyde (cinnamaldehyde propylene glycol acetal [CAPGA]), its use in gum, and methods for making the compound and for making gum and other foods.

On page 315 of West et al. "Synthetic Perfumes: Their Chemistry and Preparation," published by Edward, Arnold & Co., London, England, 1949, cinnamaldehyde dimethyl acetal is reported to "have a fine cinnamon-cassia odor which renders it useful in some Chanel-like fancy perfume and in oriental types like Tabac Blond and Fleur de Tabac." Cinnamaldehyde diethyl acetal also is discussed.

Cinnamaldehyde dimethyl acetal and diethyl acetal also were mentioned in the definitive work "Perfume and Flavor Chemicals (Aroma Chemicals)" by Steffen Arctander, privately published in Montclair, N.J. in 1969. The dimethyl acetal was described as practically colorless, carrying little or none of the odor with which the free aldehyde is associated. The diethyl acetal was described as having a "faint but fresh green slightly spicy oily sweet odor and a mild and oily sweet taste" (Page 620). Arctander judged the diethyl acetal to be of little value in flavoring because like most other acetals, the diethyl acetal was unstable under mildly acid conditions.

Arctander reported on cinnamaldehyde-2,4-dihydroxy-4-methyl-pentane acetal, describing it as having a "soft, tenacious, natural, cinnamon-type odor, not nearly as harsh as cinnamic aldehyde itself" (Page 621).

Arctander also reported on cinnamaldehyde ethylene glycol acetal, describing it as having a "sweet-spicy cinnamon-allspice taste, but not quite as sweet as the aldehyde" (Page 623). Arctander indicated that this latter acetal would be useful in flavor compositions, including all-spice, cassia, cinnamon, clove and various spice blends.

These cinnamaldehyde acetals were recognized as relatively unstable, especially in aqueous media, and thus were considered undesirable as perfume or flavor ingredients.

Acetals have been combined with other flavor chemicals to produce longer-lived chemicals. U.S. Pat. No. 3,898,283, issued Aug. 5, 1975, to Schreiber et al., teaches methods to produce phenyl pentenals, as well as their acetals.

U.S. Pat. No. 3,908,023, issued Sep. 23, 1975, to Schreiber et al., further teaches the production of cinnamon-like flavors with phenyl pentenals and their acetals. However, Schreiber points out that these chemicals are very stable, only hydrolyzing under "intense hydrolytic conditions" (col. 2, line 66). These conditions include a pH which is less than 2.5 or greater than 11.5, far different from the relatively neutral pH of saliva. This reference also teaches that 1,2- and 1,3-propylene glycol may be used in acetals to stabilize phenyl pentenals (col. 6, line 13).

U.S. Pat. No. 3,879,425, issued Apr. 22, 1975, to Hall et al., teaches that 3-phenyl-4-pentenal ethylene acetal is a stable precursor for the aldehyde, which has a green floral fragrance. It teaches that a variety of phenyl pentenals, can be combined with a variety of acetals. A list of such acetals includes propylene glycol acetal (col. 9, lines 50-51).

U.S. Pat. No. 4,571,344, issued Feb. 18, 1986, to Pittet et al., teaches preparation of a sustained release flavor by combining dithioethers of phenyl alkenals with silica and propylene glycol (cols. 23 and 24). Pittet also teaches using the silica mixture in chewing gum (col. 24, lines 43-54). Pittet also reports long-lasting flavor with the dithioether flavor alone (col. 24, lines 58-64).

Unfortunately, a disadvantage of all techniques for preventing peptide sweeteners from interacting with aldehyde compounds is that they call for encapsulating the sweetener. The more effective techniques for encapsulating the sweetener require long drying periods and coating the sweetener at least twice, an expensive process. Even then, the peptide sweetener is not always fully protected. What is needed is less expensive and more convenient protection of peptide sweeteners from chemical degradation by aldehyde compounds.

SUMMARY OF THE INVENTION

In accordance with one aspect of the present invention, there is provided a chewing gum composition which includes gum base, softener, peptide sweetener and flavor ingredients. The flavor ingredients are present at a level of about 0.1% to about 10% by weight of the chewing gum. The flavor ingredients include cinnamaldehyde acetals.

In accordance with another aspect, the present invention provides a chewing gum composition including as peptide sweeteners aspartame, alitame and others or combinations.

In accordance with another aspect, the present invention provides a chewing gum composition which includes cinnamaldehyde acetals formed by the reaction of cinnamaldehyde with propylene glycol, ethylene glycol, ethanol, butyl alcohol, glycerol, amyl alcohol, isoamyl alcohol, isopropyl alcohol, n-propyl alcohol and methanol.

In accordance with another aspect, the present invention provides a method of manufacturing a chewing gum which includes adding cinnamic aldehyde acetal to the flavor ingredients which constitute about 0.1% to about 10% by weight of the chewing gum.

In accordance with another aspect, the present invention provides a food, drug or other oral composition which has a relatively low moisture content and includes one or more cinnamaldehyde acetals as a flavor ingredient.

In accordance with another aspect, the present invention provides a method for altering the flavor of a food, drug or other oral composition which includes adding one or more acetals of cinnamaldehyde to the food.

DETAILED DESCRIPTION

The present invention contemplates the use of cinnamaldehyde acetals, i.e., compounds having the generic structure shown below:

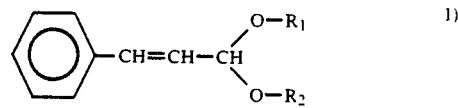

or

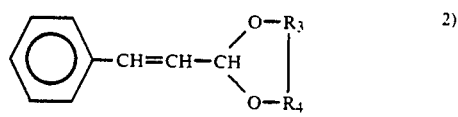

or

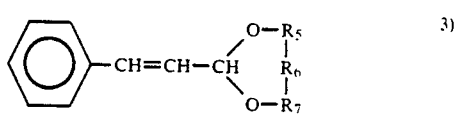

where $R_n$ is typically an alkyl or substituted alkyl group which is determined by which alcohol or alcohols are reacted with cinnamaldehyde to produce the acetal. If one monofunctional alcohol is reacted with cinnamaldehyde, the first structure is obtained, in which $R_1$ and $R_2$ are the same. If more than one monofunctional alcohol is reacted with cinnamaldehyde, $R_1$ and $R_2$ may be the same or different. If a difunctional alcohol is reacted with cinnamaldehyde, the second structure above results. If glycerol is used, the second and third structures will be formed.

Most preferred of the acetals is cinnamaldehyde propylene glycol acetal (CAPGA), which is described in commonly assigned co-pending application Ser. No. 550,676, filed Jul. 10, 1990, by Sonya Johnson and Michael Greenberg. Less preferred are acetals formed by condensation of cinnamaldehyde with ethylene glycol, ethanol, butyl alcohol, glycerol, amyl alcohol, isoamyl alcohol, isopropyl alcohol, n-propyl alcohol and methanol. Any food acceptable acetal of cinnamaldehyde also may be used.

While not wishing to be bound by any particular theory, it appears that aldehydes react rapidly with peptide sweeteners through a Schiff base reaction as shown below:

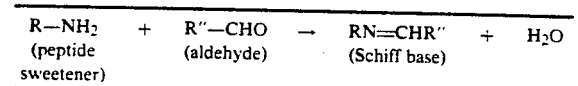

However, when the aldehyde is converted to the acetal by reaction with an alcohol under acidic conditions as shown below, the Schiff base reaction cannot occur.

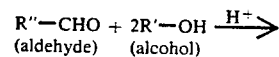

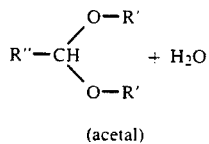

(acetal)

The acetals are relatively stable under dry conditions. When the acetals are exposed to water, they re-convert to the aldehyde, according to the following reaction:

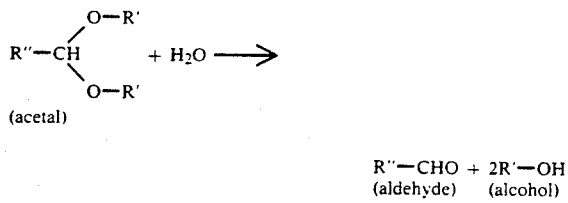

The present invention contemplates the blending of cinnamaldehyde acetals with other flavor ingredients of food acceptable quality. Examples of flavor ingredients which may be blended with cinnamaldehyde acetals include essential oils, synthetic flavors, or mixtures thereof, including but not limited to, oils derived from plants and fruits such as citrus oils, fruit essences, peppermint oil, spearmint oil, clove oil, anise and the like. Also exemplary of flavor blends which contain cinnamaldehyde acetals are cinnamon and other spice and fruit flavors. Artificial flavor ingredients are also contemplated for blending with cinnamaldehyde acetals. Those skilled in the art will recognize that natural and artificial flavor ingredients may be combined with cinnamaldehyde acetals in any manner. All such flavor ingredients and blends are contemplated for use in the method of the present invention.

A preferred use of this invention is in chewing gum. This invention can also be used in a variety of other products, examples of which are foods such as candies, dry beverage, gelatin and pudding mixes, drugs and toothpaste. The preferred embodiments are in foodstuffs with a relatively low moisture content, at least during storage. Preferably, the formulation of the food is less than 10% by weight water. More preferred is less than 5% water. Even more preferred is a water content less than 2%. Most preferred is a water content less than 1%. All percentages given herein are by weight unless otherwise specified.

As mentioned above, a presently preferred use for cinnamaldehyde acetal is the incorporation of cinnamaldehyde acetals into chewing gum. Cinnamaldehyde acetal may be mixed with the chewing gum ingredients at any time during the manufacturing process. More preferred is the addition of cinnamaldehyde acetals to other flavor ingredients before incorporation into chewing gum ingredients; this contributes to better blending. Preferably, this flavor mixture is added to the chewing gum mixture near the end of the mixing process. If water-bearing ingredients are used, it is preferable that cinnamaldehyde acetals be kept separate from such ingredients as long as possible to minimize hydrolysis of the acetal.

In general, a chewing gum composition comprises a water soluble bulk portion, a water insoluble chewable gum base portion and, typically, water insoluble flavor ingredients. The water soluble portion dissipates with a portion of the flavor over a period of time during chewing. The gum base portion is retained in the mouth throughout the chew.

The insoluble gum base generally comprises elastomers, resins, fats and oils, waxes, softeners and inorganic fillers. Elastomers may include polyisobutylene, isobutylene-isoprene copolymer, styrene butadiene rubber, as well as natural latexes such as chicle. Resins include polyvinylacetate and terpene resins. Fats and oils may also be included in the gum base including tallow, hydrogenated and partially hydrogenated vegetable oils and cocoa butter. Commonly employed waxes include beeswax and carnauba. The insoluble gum base constitutes between about 5 to about 95 weight percent of the gum. Preferably, the gum comprises about 10 to about 50 weight percent of insoluble gum base, and more preferably about 20 to 30 weight percent.

The gum base typically also includes a filler component. The filler component may be calcium carbonate, magnesium carbonate, talc, dicalcium phosphate, and the like. The filler may constitute between about 5 to about 60% of the gum base. Preferably, the chewing gum base comprises about 5 to 50% filler.

The gum base typically also contains softeners, including glycerol monostearate and glycerol triacetate. Further, gum bases may also contain optional ingredients such as antioxidants, colors and emulsifiers. The present invention contemplates employing any commercially acceptable gum base.

The water soluble portion of chewing gum may further comprise softeners, sweeteners, flavors and combinations thereof. The softeners are added to the chewing gum in order to optimize the chewability and mouth feel of the gum. Softeners, also known in the art as plasticizers or plasticizing agents, generally constitute about 0.1 to about 15% of the chewing gum. Softeners contemplated by the present invention include glycerin, lecithin and combinations thereof. Aqueous sweetener solutions such as those containing sorbitol, hydrogenated starch hydrolysates, corn syrup and combinations thereof may be used as softeners and binding agents in gum. Because of the potential hydrolysis of cinnamaldehyde acetals, a preferred embodiment minimizes or eliminates these ingredients.

The chewing gums and oral compositions of the present invention will include one or more peptide sweeteners. These sweeteners are di- or higher peptides typically modified with an alkyl ester group and including at least one free amine group. They typically possess intense sweetness several hundred times that of sucrose. The most commonly used peptide sweeteners are the dipeptide sweeteners known as aspartame and alitame.

Other sweeteners contemplated by the present invention for use in chewing gum include both sugar and sugarless components. Sugar sweeteners generally include saccharide-containing components commonly known in the chewing gum art which comprise but are not limited to sucrose, dextrose, maltose, dextrin, dried invert sugar, fructose, levulose, galactose, corn syrup solids and the like, alone or in any combination. Sugarless sweeteners include components with sweetening characteristics but are devoid of the commonly known sugars and comprise, but are not limited to, sugar alcohols such as sorbitol, mannitol, xylitol, hydrogenated starch hydrolysates, maltitol and the like, alone or in any combination.

Although the present invention is intended for use with peptide sweeteners, other high intensity sweeteners may be used in addition to the peptide sweetener. Other high intensity sweeteners include sucralose, cyclamate, acesulfame-K, dihydrochalcones and saccharin.

Any combination of sugar and/or sugarless sweeteners may be employed in the chewing gum. Further, a sweetener may be present in a chewing gum in whole or in part as a water soluble bulking agent. In addition, the softener may be combined with a sweetener such as an aqueous sweetener solution.

The flavor ingredients contemplated by the present invention include flavor ingredients which are of food acceptable quality and are compatible with cinnamaldehyde acetals. Cinnamaldehyde acetal flavor may be blended with other essential oils, synthetic flavor ingredients, or mixtures thereof, including but not limited to oils derived from plants and fruits such as citrus oils, fruit essences, peppermint oil, spearmint oil, clove oil, anise, cola, chocolate and the like. Artificial flavor ingredients are also contemplated by the present invention. Those skilled in the art will recognize that the natural and artificial flavor ingredients may be combined in any manner.

Cinnamaldehyde acetals may be added to chewing gum in which the chewing gum comprises from about 0.1% to about 10% flavor ingredients. Preferably, the chewing gum is about 0.5% to about 5% flavor ingredients. When used in chewing gum, the optimum level of cinnamaldehyde acetals is preferably determined through sensory testing. The level is expected to vary widely depending on the type and level of gum base used, the type and level of flavor used, and other factors. The level used will also vary with the different acetals. Cinnamaldehyde acetals may be used at a level of about 0.01% to about 100% of the flavor ingredients. Preferably, the level of cinnamaldehyde acetal is between about 0.1% and about 60% of the total flavor composition.

In another embodiment, the chewing gum includes cinnamon flavor ingredients at a level of about 0.1% to about 4% of the chewing gum. For cinnamon and other spice flavors, the level of cinnamaldehyde acetals is at least about 0.01% but can be as high as 100% of the total flavor composition. Preferably, the flavor ingredients comprise at least 10% cinnamaldehyde acetal. More preferably, the level of cinnamaldehyde acetal is between about 20% and about 60% of the flavor ingredients, depending on the results of sensory testing.

In another embodiment, a small quantity of cinnamaldehyde is added to adjust the character of the cinnamon flavor of cinnamon gum. In such a case, the level of cinnamaldehyde is kept to a minimum in order to reduce degradation of the peptide sweetener. Preferably, cinnamaldehyde constitutes less than about 20% of the flavor ingredients. Even more preferably, cinnamaldehyde is less than about 10% of the flavor ingredients.

In still another embodiment, the chewing gum includes fruit flavor ingredients at a level of about 0.4% to about 2% of the chewing gum. In fruit-flavored gums, the preferred level of cinnamaldehyde acetal is about 0.01% to about 60% of the flavor ingredients. More preferred for fruit-flavored gums is a level of about 0.1% to about 1.2%. Most preferred for fruit-flavored gums is a level of about 0.4% to about 1.2%.

Other ingredients such as colors, emulsifiers, and pharmaceutical agents may be added to the chewing gum.

In general, chewing gum is manufactured by sequentially adding the various chewing gum ingredients to any commercially available mixer known in the art. After the ingredients have been thoroughly mixed, the gum mass is discharged from the mixer and shaped into the desired forms such as by rolling into sheets and cutting into sticks, extruding into chunks, or casting into pellets. Generally, the ingredients are mixed by first melting the gum base and adding it to the running mixer. The base may also be melted in the mixer itself. Color may also be added at this time. A softener such as glycerin may then be added next along with syrup and a portion of bulking agent. Further portions of the bulking agents may be added to the mixer. Under proper conditions, cinnamaldehyde acetals may be added at any time during the gum manufacturing process. Preferably, the flavor of the present invention is first added to other flavor ingredients. Preferably, the flavor ingredients are added to the gum mixture near the end of the mixing process.

The entire mixing procedure typically takes from about 5 minutes to about 15 minutes, but longer mixing times may sometimes be required.

According to another aspect of the invention, cinnamaldehyde acetals may be used to flavor other foods, drugs or other oral compositions. Preferably, the flavor ingredients constitute from about 0.01% to about 10% of the oral composition. When used in oral compositions, the optimum level of cinnamaldehyde acetal is from about 0.01% to about 60% of the flavor ingredients. In a particular embodiment, cinnamaldehyde acetal is added to toothpaste.

Those skilled in the art will recognize that variations of the above described procedure may be followed. It is to be understood that an equivalent of changes and modifications of the embodiments described above are also contemplated by the present invention. The following examples are not to be construed as limitations upon the present invention, but are included merely as an illustration of various embodiments.

EXAMPLES

Example 1

To demonstrate the effectiveness of acetals in preventing aspartame breakdown, the stability of aspartame in solution with cinnamaldehyde or with an acetal of cinnamaldehyde was tested in the following manner:

1. 5.00 g of aspartame was dissolved in 1000 ml of methanol. To ensure complete solution, the mixture was stirred at room temperature for 3.5 hours.

2. 100 ml of the aspartame in methanol solution was removed. 1 ml of the 100 ml solution was further removed, added to 100 ml of aqueous buffer (to arrest degradation of aspartame), and analyzed by high pressure liquid chromatography (HPLC) for aspartame content. This value was the $T_0$ value for aspartame concentration.

3. To the remaining 99 ml of aspartame in methanol solution was added 2.27 g of cinnamaldehyde. This solution was stirred constantly using a magnetic stirrer.

4. 1 ml samples were removed after 30, 60, 90, 120 and 180 minutes. Each was diluted with 100 ml of aqueous buffer and analyzed by HPLC for aspartame. Results are shown in Table 1.

5. Another 100 ml portion of the stock aspartame-in-methanol solution was treated identically except that the 2.27 g cinnamaldehyde was replaced with an equimolar amount of cinnamaldehyde propylene glycol acetal (CAPGA), or 3.24 g. Samples were obtained at the same intervals as above and results are shown in Table 1. By substituting CAPGA for cinnamaldehyde, aspartame degradation was reduced by 85%.

TABLE 1

HPLC DETERMINATION OF ASPARTAME

| Time (min) | Remaining Aspartame in Methanol (mg/100 ml) | |
|---|---|---|
| | Cinnamaldehyde | CAPGA |
| 0 | 4.77 | 4.81 |
| 30 | 4.31 | 4.67 |
| 60 | 3.56 | 4.62 |
| 90 | 2.70 | 4.59 |
| 120 | 2.09 | 4.43 |
| 180 | 1.31 | 4.28 |

Example 2

To determine the results of cinnamaldehyde acetal substitution on an actual product, three laboratory-scale batches of gum were prepared, stored at 85° F. and were analyzed for aspartame content at intervals of 0, 1, 3, 7, 14 and 21 days. The following formulas were used.

TEST GUM FORMULAS (weight %)

| INGREDIENT | A | B | C |
|---|---|---|---|
| Gum Base | 29.90 | 29.90 | 29.90 |
| Lecithin | 0.25 | 0.25 | 0.25 |
| Sorbitol | 51.95 | 51.73 | 51.51 |
| Aspartame | 0.50 | 0.50 | 0.50 |
| Glycerin | 8.80 | 8.80 | 8.80 |
| Mannitol | 6.00 | 6.00 | 6.00 |
| Peppermint Oil | 0.20 | 0.20 | 0.20 |
| Spice Flavor Mix | 0.40 | 0.40 | 0.40 |
| Cinnamaldehyde | 2.00 | 1.00 | — |
| CAPGA* | — | 1.22 | 2.44 |
| TOTAL | 100.00 | 100.00 | 100.00 |

*Cinnamaldehyde propylene glycol acetal

The spice flavor mix was a blend of complementary essential oils and other flavor components with no significant aldehyde content. As in Example 1, a greater weight of CAPGA replaced the cinnamaldehyde to maintain molarity.

The three chewing gums were mixed, rolled flat and cut into pieces of gum which were wrapped in moisture resistant packaging and aged at 85° F. The results of HPLC testing for aspartame are reported in Table 2 as weight percent of the total gum composition.

TABLE 2

ASPARTAME CONTENT OF AGED GUM SAMPLES

| Day | Remaining Aspartame (weight %) | | |
|---|---|---|---|
| | A | B | C |
| 0 | 0.44 | 0.43 | 0.49 |
| 1 | 0.30 | 0.35 | 0.48 |
| 3 | 0.19 | 0.29 | 0.46 |
| 7 | 0.08 | 0.20 | 0.45 |
| 14 | 0.03 | 0.16 | 0.43 |
| 21 | 0.02 | 0.14 | 0.42 |

Replacement of one half of the cinnamaldehyde with CAPGA reduced aspartame loss by 31%. Replacement of all of the cinnamaldehyde with CAPGA reduced aspartame loss by 83%.

In addition, the three gums were chewed by four experienced flavor panelists shortly after the individual pieces of gum were prepared. The three gums were not identified by formula and were presented to the panelists in random order for 3–4 minute chews. While chewing each sample, the panelists recorded their sensations. When the results were summarized, it was apparent that all four panelists preferred gum C for its cinnamon flavor. Next in popularity was gum A, followed by gum B.

Example 3

To confirm the stabilizing effect of cinnamaldehyde acetals on other peptide sweeteners, the solution test of Example 1 was repeated using alitame instead of aspartame. A 5.0146 g/liter alitame stock solution was used, and 2.2625 g cinnamaldehyde or 3.2596 g CAPGA were added to the stock solution. The solutions were reacted and tested as in Example 1. The results are shown in Table 3.

TABLE 3

HPLC DETERMINATION OF ALITAME

| Time (min) | Remaining Aspartame in Methanol (mg/100 ml) | |
|---|---|---|
| | Cinnamaldehyde | CAPGA |
| 0 | 4.86 | 4.86 |
| 30 | 4.29 | NA |
| 60 | 3.24 | 4.63 |
| 90 | 2.10 | 4.60 |
| 120 | 1.62 | 4.58 |
| 180 | 1.00 | 4.56 |

Thus, degradation of alitame was reduced by 92% (reduction of 4.86 to 1.00, a loss of 3.86, improved to a loss of only 0.3 ) when CAPGA replaced cinnamaldehyde.

We claim:

1. A method of manufacturing a chewing gum, comprising the steps of:
   (a) providing chewing gum ingredients, comprising gum base, softener and sweetener ingredients selected from the group consisting of aspartame, alitame and mixtures thereof;
   (b) providing flavor ingredients comprising at least one cinnamic aldehyde acetal; and
   (c) mixing the flavor ingredients with the chewing gum ingredients;
wherein the flavor ingredients comprise from about 0.1% to about 10% by weight of the chewing gum.

2. The method of claim 1, wherein the acetal portion of cinnamic aldehyde acetal is derived from an alcohol selected from the group consisting of propylene glycol, ethylene glycol, ethanol, butyl alcohol, glycerol, amyl alcohol, isoamyl alcohol, isopropyl alcohol, n-propyl alcohol, and methanol and mixtures thereof.

3. The method of claim 1, wherein the flavor ingredients comprise cinnamic aldehyde acetal at a level of about 0.01% to about 60% by weight of flavor ingredients.

4. The method of claim 1, wherein the flavor ingredients comprise cinnamon flavor ingredients, the cinnamon flavor ingredients constituting from about 0.1 to about 4% by weight of the chewing gum.

5. The method of claim 4, wherein the cinnamon flavor ingredients comprise cinnamic aldehyde acetal at a level of about 10% to about 100% by weight of flavor ingredients.

6. The method of claim 4, wherein the cinnamon flavor ingredients comprise cinnamic aldehyde acetal at a level of about 20% to about 60% by weight of flavor ingredients.

7. The method of claim 1, wherein the flavor ingredients comprise fruit flavor ingredients, the fruit flavor ingredients constituting from about 0.4% to about 2% by weight of the chewing gum.

8. The method of claim 7, wherein the fruit flavor ingredients comprise cinnamic aldehyde acetal at a level of about 0.1% to about 60% by weight of the flavor ingredients.

9. The method of claim 7, wherein cinnamic aldehyde acetal constitutes about 0.4% to about 1.2% by weight of the flavor ingredients.

* * * * *

UNITED STATES PATENT AND TRADEMARK OFFICE
CERTIFICATE OF CORRECTION

PATENT NO. : 5,167,972
DATED : December 1, 1992
INVENTOR(S) : Michael J. Greenberg et al.

It is certified that error appears in the above-identified patent and that said Letters Patent is hereby corrected as shown below:

On the title page: Item [56]

IN THE REFERENCES CITED column 2, under the heading "U.S. PATENT DOCUMENTS", please add:

| | | | |
|---|---|---|---|
| --3,862,340 | 01/1975 | Schreiber et al. | 426/65 |
| 3,879,425 | 04/1975 | Hall et al. | 260/340.9 |
| 3,898,283 | 08/1975 | Schreiber et al. | 260/565 R |
| 3,908,023 | 09/1975 | Schreiber et al. | 426/536 |
| 3,922,237 | 11/1975 | Schreiber et al. | 252/522 |
| 3,928,644 | 12/1975 | Schreiber et al. | 426/535 |
| 3,963,618 | 06/1976 | Muir | 210/500 M |
| 3,966,768 | 06/1976 | Pawloski | 260/338 |
| 4,031,140 | 06/1977 | Schreiber et al. | 260/611 A |
| 4,101,720 | 07/1978 | Taylor et al. | 526/3 |
| 4,190,602 | 02/1980 | Brunisholz et al. | 260/590 D |
| 4,360,606 | 11/1982 | Tobias et al. | 523/124 |
| 4,492,645 | 01/1985 | Sprecker et al. | 252/522 R |
| 4,571,344 | 02/1986 | Pittet et al. | 426/535 |
| 4,623,538 | 11/1986 | Pittet et al. | 424/52 |
| 4,626,599 | 12/1986 | Pittet et al. | 568/57 |
| 4,722,845 | 02/1988 | Cherukuri et al. | 426/5 |
| 4,804,002 | 02/1989 | Herron | 131/365 |
| 4,839,184 | 06/1989 | Cherukuri et al. | 426/307 |

UNITED STATES PATENT AND TRADEMARK OFFICE
CERTIFICATE OF CORRECTION

PATENT NO. : 5,167,972
DATED : December 1, 1992
INVENTOR(S) : Michael J. Greenberg et al.

It is certified that error appears in the above-identified patent and that said Letters Patent is hereby corrected as shown below:

4,845,156    07/1989    Cohen . . . . . . . . . . . 525/259
    4,863,745    09/1989    Zibell . . . . . . . . . . . 426/5
    4,931,295    06/1990    Courtright et al. . . . . . 426/5

OTHER PUBLICATIONS

STEFFEN ARCTANDER, PERFUME AND FLAVOR CHEMICALS (AROMA CHEMICALS), PUBLISHED BY THE AUTHOR 1969, MONTCLAIR, NEW JERSEY (USA).

HEATH, HENRY B., M.B.E., B. PHARM. (LONDON) FLAVOR TECHNOLOGY: PROFILES, PRODUCTS, APPLICATIONS, 1978, The Avi Publishing Company, Inc., Westport, Connecticut.--

Signed and Sealed this

Twelfth Day of April, 1994

*Attest:*

BRUCE LEHMAN

*Commissioner of Patents and Trademarks*

*Attesting Officer*